United States Patent [19]
Kanaoka

[11] 3,987,760
[45] Oct. 26, 1976

[54] ROTARY PISTON TYPE ENGINE

[75] Inventor: Masaharu Kanaoka, Hiroshima, Japan

[73] Assignee: Toyo Kogyo Co., Ltd., Japan

[22] Filed: July 3, 1974

[21] Appl. No.: 485,545

[30] Foreign Application Priority Data
July 7, 1973 Japan.............................. 48-76741
July 7, 1973 Japan.............................. 48-76740

[52] U.S. Cl. ............................................. 123/8.13
[51] Int. Cl.² ......................................... F02B 53/10
[58] Field of Search............... 123/8.09, 8.11, 8.13, 123/32 ST

[56] References Cited
UNITED STATES PATENTS
3,858,558  1/1975  Hart................................. 123/8.13

*Primary Examiner*—William L. Freeh
*Assistant Examiner*—Michael Koczo, Jr.
*Attorney, Agent, or Firm*—Fleit & Jacobson

[57] ABSTRACT

In a rotary piston type engine including casing which comprises a rotor housing having a trochoidal inner periphery and a pair of side housings secured to the opposite sides of the rotor housing, and a substantially triangular rotor rotatably disposed in said casing with apices in sliding engagement with the inner peripheral wall of the rotor housing, one of the side housings having a first intake port always covered by said rotor, the other of said side housings having a second intake port which is adapted to be cyclically opened as the rotor rotates, said rotor being provided with passages each of which is cyclically brought into communication at one end with said first intake port and opening at the other end to the periphery of the rotor.

16 Claims, 8 Drawing Figures

ROTARY PISTON TYPE ENGINE

The present invention relates to a rotary piston type engine and more particularly to such a rotary piston type engine that includes a casing having a cavity of trochoidal peripheral configuration and a substantially triangular rotor disposed in the cavity of the casing for rotation with apices thereof in sliding engagement with the peripheral wall of the cavity.

The present invention has an object to minimize air polluting constituents in exhaust gas discharged from a rotary piston engine of the aforementioned type.

Another object of the present invention is to provide a rotary piston type engine in which stratified condition of combustible fuel-air mixture can readily be formed.

A further object of the present invention is to provide a rotary piston type engine in which incomplete combustion of fuel-air mixture can be minimized.

Still further object of the present invention is to provide a rotary piston type engine which can be operated with fuel-air mixture of relatively lean overall mixing ratio.

According to the present invention, the above and other objects can be achieved by a rotary piston engine comprising a casing which includes a rotor housing having a trochoidal inner peripheral wall and a pair of side housings secured to the opposite sides of the rotor housing to define a cavity therein, and a substantially triangular rotor having a peripheral wall and opposite side surfaces and disposed in said cavity for rotation with apices thereof in sliding contact with the inner peripheral wall of the rotor housing so as to define working chambers of variable volume between the inner peripheral wall of the rotor housing and the peripheral wall of the rotor, the improvement comprising first intake port means provided in at least one of said side housings and always covered by the adjacent side surface of the rotor, communication passages provided in said rotor at least one for each area of the peripheral wall between each two apices, each of the communication passages having one end opening to said area of the rotor peripheral wall and the other end adapted to be cyclically brought into communication with said first intake port means as the rotor rotates, means for supplying fuel rich mixture to said first intake port means, and second intake port means provided in at least one of said side and rotor housings. According to a preferred mode of the present invention, the second intake port means is provided in such a position that it is closed after the communication between each communication passage and the first intake port means is interrupted. In a further mode of the present invention, an auxiliary combustion chamber is provided for each of said areas of the rotor and cyclically brought into communication with said first intake port means, said auxiliary combustion chamber being opened to corresponding area of the rotor through corresponding one of the communication passages.

The above and other objects and features of the present invention will become apparent from the following descriptions of the preferred embodiments taking reference to the accompanying drawings, in which.

Figure 1:
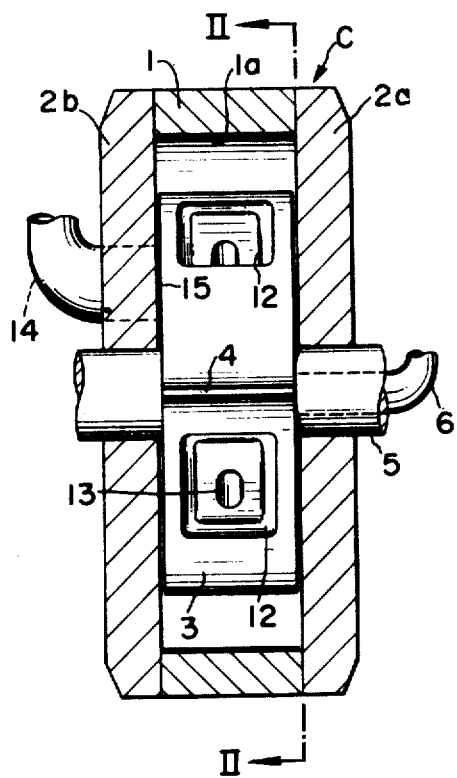
FIG. 1 is a longitudinal sectional view of a rotary piston type engine in accordance with one embodiment of the present invention.
Figure 3:
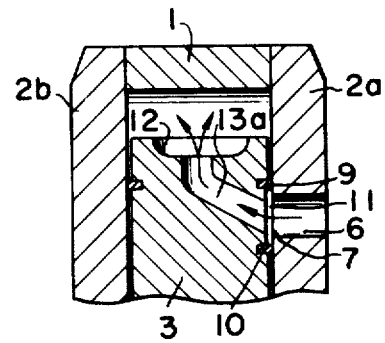
FIG. 3 is a fragmentary sectional view taken substantially along line III—III in FIG. 2 and as seen in the direction of arrows.
Figure 2:
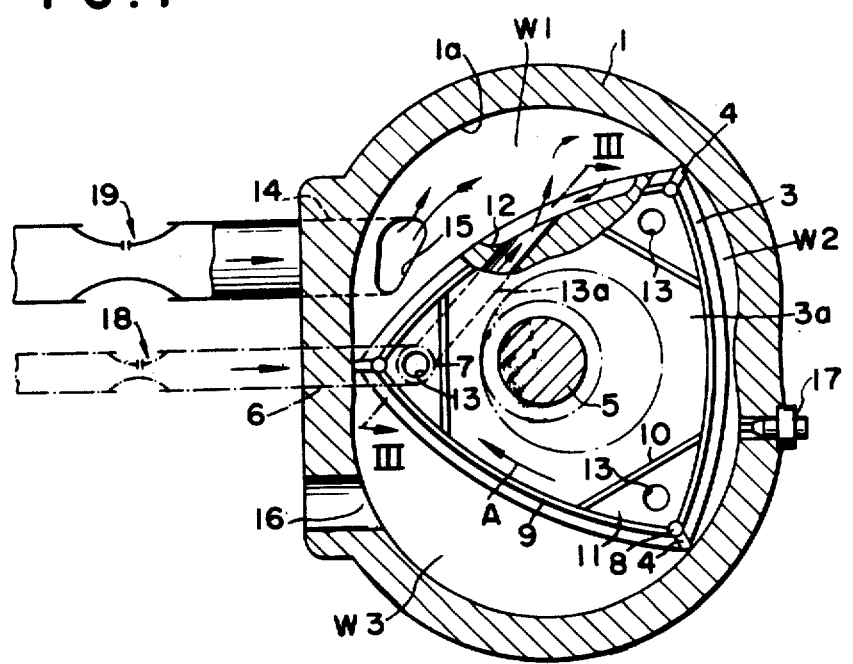
FIG. 2 is a sectional view taken substantially along the line II—II in FIG. 1.
Figure 4:
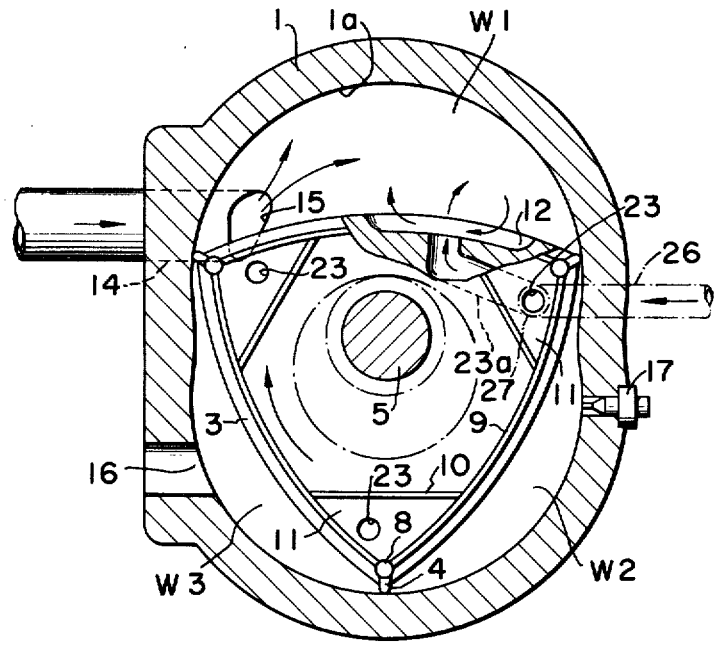
FIG. 4 is a sectional view similar to FIG. 2 but showing another embodiment of the present invention.
Figure 5:
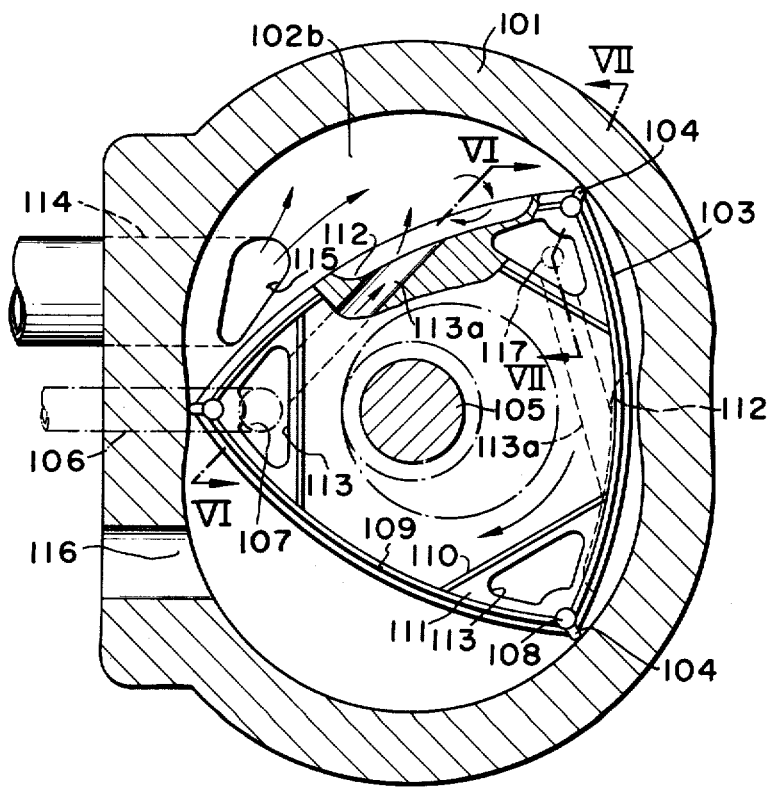
FIG. 5 is a sectional view similar to FIGS. 2 and 4 but showing a further embodiment of the present invention.
Figure 6:
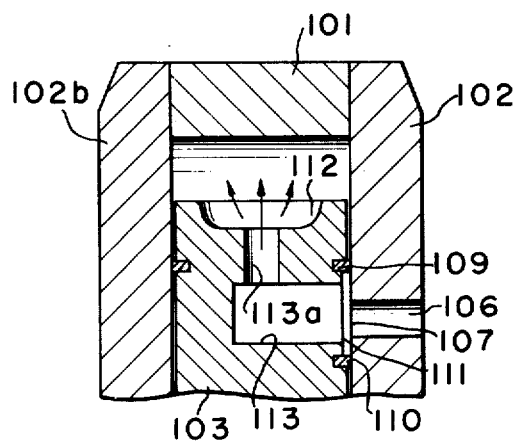
Figure 7:
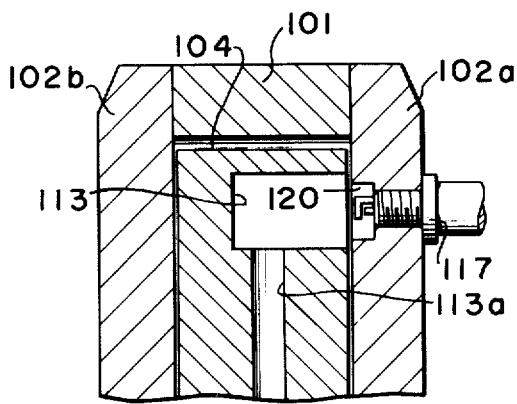
Figure 8:
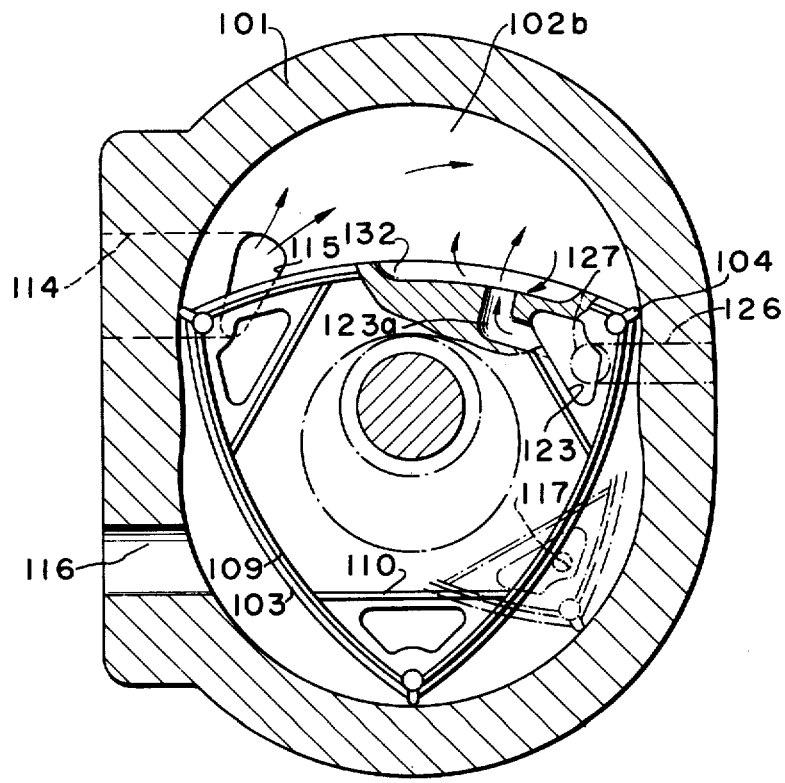

FIGS. 6 and 7 are fragmentary sectional views taken substantially along lines VI—VI and VII—VII in FIG. 5 and as seen in the directions shown by arrows; and FIG. 8 is a sectional view similar to FIGS. 2, 4 and 5 but showing a still further embodiment Referring now to the drawings, particularly to FIGS. 1 through 3, there is shown a rotary piston type engine comprising a casing C which includes a rotor housing 1 having a trochoidal inner peripheral wall 1a, and a pair of side housings 2a and 2b secured to the opposite sides of the rotor housing 1 to define a cavity therein. A substantially triangular rotor 3 is disposed in the cavity and has an apex seal 4 at each of the apices. As is well known in the art, an output shaft 5 is combined with the rotor 3 which is rotatable in the cavity of the casing C as shown by an arrow A with the apex seals 4 in sliding contact with the inner peripheral wall 1a of the rotor housing 1. Thus, three working chambers W1, W2 and W3 of variable volume are defined in the casing C between the rotor housing 1 and the rotor 3. At each side surface 3a of the rotor 3, there are provided corner seals 8 and side seals 9 in a manner well known in the art. According to a feature of the present invention, one of the side housings 2a is provided with a first intake port 7 which is connected with a first intake passage 6. The first intake port 7 is located at a position where the port is always covered by the rotor 3 during operation of the engine. As shown in FIG. 2, the rotor 3 is provided with three communication ports 13 which open at the side of the rotor 3 facing to the side housing 2a. Each port 13 is connected with a rich mixture passage 13a which opens to a recess 12 provided on the rotor 3 at each portion of the periphery thereof between each two apex seals 4. An auxiliary seal 10 is provided on the side surface of the rotor 3 to define a substantially triangular chamber 11 encircling each of the ports 13 together with the side seals 9. As the rotor 3 rotates, each chamber is sequentially brought into communication with the first intake port 7 at an appropriate timing of the engine operating so as to introduce fuel rich mixture into the working chamber $W_1$ which is in the intake stroke. As shown diagrammatically in FIG. 2, the first intake passage 6 is provided with fuel metering means 18 which may be a conventional carburetor.

The other side housing 2b is provided with a second intake port 15 which is connected with a second intake passage 14 and opening to the working chamber $W_1$ which is in the intake stroke. The second intake passage 14 may also be provided with second fuel metering means so as to form a fuel lean mixture in the passage 14 when desired. The rotor housing 1 is further provided with an exhaust port 16 and an ignition plug 17 as well known in the art.

In operation, as the rotor 3 rotates in the direction shown by the arrow A, the second intake port 15 is first brought into communication with the working chamber which is in the final stage of the exhaust stroke. Thus, air or fuel lean mixture is introduced into the corresponding working chamber. Thereafter, one of the chamber 11 is connected with the first intake port 7 so that fuel rich mixture begins to flow into the same working chamber through the port 13 and the passage 13a. As the rotor 3 rotates further from the position shown in FIG. 2, the chamber 11 is put out of communication with the first intake port 7 and the flow of the fuel rich mixture from the passage 13a is terminated. Thereafter, the second intake port 15 is closed by the rotor 3 to complete the intake stroke. It should be noted that, during a substantial period of the intake stroke, the passage 13a opens to the working chamber $W_1$ at a position offset from the second intake port 15 toward the direction of rotation of the rotor 3. Thus, the fuel rich mixture is introduced into the working chamber at the leading portion thereof as compared with the air or fuel lean mixture which is introduced through the port 15. Further, even after the first intake port 7 is closed, air or fuel lean mixture continues to flow into the working chamber at the trailing portion thereof until the second intake port 15 is closed. Therefore, the mixture introduced into the working chamber is stratified with fuel rich portion at the leading portion of the working chamber and fuel lean portion at the trailing portion thereof. The mixture is then compressed in the working chamber and ignited at the fuel rich portion thereof by the ignition plug 17. Since the mixture is effectively stratified in the working chamber and ignition takes place at the fuel rich portion thereof, any risk of misfiring can be avoided. Further, it is possible to obtain a stable engine operation with a relatively lean overall fuel-air mixing ratio.

FIG. 4 shows a modification of the engine shown in FIGS. 1 through 3. In this arrangement, a first intake port 27 is provided on one of the side housings at a position adjacent to the side where the ignition plug 17 is mounted. Corresponding communication passages 23 are formed in a side face of the rotor 3 and connected with a passage 23a which opens at the periphery of the rotor 3 as in the previous embodiment. It should particularly be noted that in this arrangement and also in the arrangement of FIGS. 1 through 3, the second intake port may be provided in the rotor housing. The arrangements are particularly advantageous in that the mixture in the intake working chamber can be effectively stratified and that the rotor 3 itself is cooled by the mixture passing through the passage 13a or 23a.

Referring now to FIGS. 5 and 7 of the drawings, there is shown a further embodiment of the present invention. The arrangement of the embodiment is substantially identical to that shown in FIGS. 1 through 3, so that corresponding parts are shown by the same reference numerals as in FIG. 1 through 3 with the addition of numeral 100. One of the side housings, for example, the side housing 102a is provided with a first intake port 107, as shown by phantom line in FIG. 5 and by solid line in FIG. 6, which communicates with a first intake passage 106. Further, as in the previous embodiment, the side housing 102b is provided with a second intake port 115 which is connected with a second intake passage 114. The rotor 103 is provided with three auxiliary ignition chambers 113 located one adjacent to each apex of the rotor 103. Each of the auxiliary combustion chambers 113 opens at the side surface of the rotor 103 facing to the side housing 102a in which the first intake port 107 is provided, and is connected with a communication passage 113a which opens to a recess 112 formed in the periphery of the rotor 103 between adjacent two apex seals 104. As shown in FIG. 7, an ignition plug 117 is mounted on the side housing 102a in a recess 120 which cyclically comes into communication with the auxiliary combustion chamber 113. Thus, in this embodiment, ignition takes place at the portion of fuel rich mixture in the chamber 113 and combustion flame is propagated through the passage 113a into the working chamber.

FIG. 8 shows a modification of the embodiment shown in FIGS. 5 through 7. This arragement is different from that in FIGS. 5 through 7 in that each of the auxiliary combustion chambers 123 is connected through the passage 123a with a working chamber which is located with respect thereto at the side opposite to the direction of rotation of the rotor 103. It should be noted that, in the arrangements of FIGS. 5 through 6 and FIG. 8, fuel rich mixture flowing through first intake port 127 from first intake passage 126 exists mainly in the auxiliary chamber 123 and it is possible to maintain the mixture in the working chamber relatively lean without encountering incomplete combustion problem.

In a conventional rotary piston type engine, it has been recognized that incomplete combustion takes place due to fuel rich mixture existing at the trailing portion of the working chamber. However, according to the present invention, it is possible to maintain fuel lean mixture at the trailing portion of the working chamber so that the amount of unburnt constituents in the exhaust gas can be remarkably decreased. Further, since the mixture is ignited at the fuel rich portion, any risk of misfiring can be effectively avoided and the engine can be operated with a relatively lean overall mixing ratio of the mixture.

The invention has thus been shown and described with reference to preferred embodiments, however, it should be noted that the invention is in no way limited to the details of the illustrated arrangements but changes and modifications may be made without departing from the scope of the appended claims.

I claim:

1. A rotary piston engine comprising, in combination, a casing including a rotor housing having a trichoidal inner peripheral wall and a pair of side housings secured to opposite sides of said rotor housing to define a cavity, a substantially triangular rotor having a peripheral wall and opposite side surfaces rotatably disposed in said cavity, said rotor being provided with apices for sliding contact with said rotor housing inner peripheral wall to thereby define working chambers of variable volume producing a series of strokes including an intake stroke between said rotor housing inner peripheral wall and said rotor peripheral wall, a plurality of communication passages in said rotor each associated with one of the areas of said rotor peripheral wall between said apices, and having one end opening into the leading portion of the associated area of the rotor peripheral wall in the direction of the rotation of the rotor, the other ends of said communication passages each opening into one of said rotor side surfaces, first intake port means in one of said side housings in continuously covered relationship with the adjacent side surface of said rotor, means for supplying a rich air-fuel mixture to said first intake port means, second intake port means provided in one of said side and rotor housings for communicating with the working chambers producing said intake stroke, means for supplying a combustion supporting medium to said second intake port means, each of said other ends of said communication passages being arranged to sequentially and cyclically communicate with said first intake port means during the rotation of said rotor and during the intake stroke of the working chamber defined by the area of said rotor peripheral wall containing said one end of said communication passage in communication with said first intake port means to introduce a rich air-fuel mixture into said working chamber during said intake stroke, said second intake port means being arranged to communicate with said working chamber during said intake stroke to thereby also supply said working chamber with a combustion supporting medium, and ignition means on said casing for igniting the fuel in said casing.

2. A rotary piston type engine in accordance with claim 1 including sealing means on said one side surface of said rotor in sealing engagement with said one side housing for defining a chamber encircling said other end of each of said communication passages.

3. A rotary piston type engine in accordance with claim 1 wherein said second intake port means is arranged to be closed by said rotor subsequent to the interruption of the communication between said first intake port means and said other end of said communication passages.

4. A rotary piston type engine in accordance with claim 1 wherein said ignition means is arranged to ignite said fuel between said housing inner peripheral wall and said rotor peripheral wall.

5. A rotary piston type engine in accordance with claim 1 including an auxiliary combustion chamber at each of said other ends of said communication passages, said auxiliary combustion chambers opening into said one side surface of said rotor for sequentially and cyclically communicating with said first intake port means to fill said auxiliary chambers with said rich air-fuel mixture and wherein said ignition means is positioned on said casing for sequentially and cyclically igniting said rich air-fuel mixture in said auxiliary combustion chambers for propagation of the resulting combustion flame through the associated communication passage into the associated working chamber.

6. A rotary piston type engine in accordance with claim 5 wherein said igniting means comprises a recess formed in said one side housing and an ignition plug mounted in said recess.

7. A rotary piston engine in accordance with claim 1 wherein said one end of each of said communication passages is offset from said second intake port means whereby said rich air-fuel mixture is introduced into the leading portion of said working chamber and said combustion supporting medium is introduced into the trailing portion of said working chamber during said intake stroke for stratification of said medium and said mixture in said working chamber.

8. In a rotary piston engine of the type having a casing including a rotor housing having a trochoidal inner peripheral wall and a pair of side housings secured to opposite sides of said rotor housing to define a cavity, a substantially triangular rotor having a peripheral wall and opposite side surfaces rotatably disposed in said cavity, said rotor being provided wwith apices for sliding contact with said rotor housing inner peripheral wall to thereby define working chambers of variable volume producing a series of strokes including an intake stroke between said rotor housing inner peripheral wall and said rotor peripheral wall, first intake port means in said casing for supplying a first combustion supporting medium sequentially and cyclically to the working chambers during the intake strokes, the improvement which comprises, a plurality of communication passages in said rotor each associated with one of the areas of said rotor peripheral wall defined between pairs of said apices and having one end opening into the leading portion of the associated area of said rotor peripheral wall in the direction of rotation of said rotor, the other ends of said communication passages each opening into one of said rotor side surfaces, second intake port means in the one of said side housings adjacent said one rotor side surface and located to be in a continuously covered relationship with said one rotor side surface, means for supplying a second combustion supporting medium to said second intake port means, each of said other ends of said communication passages being arranged to sequentially and cyclically communicate with said second intake port means during the rotation of said rotor for introducing said second combustion supporting medium into said other ends of said communication passages, and ignition means on said casing for initiating combustion of combustion supporting medium within said casing.

9. A rotary piston engine in accordance with claim 8 wherein said first combustion supporting medium is air.

10. A rotary piston engine in accordance with claim 8 wherein said first combustion supporting medium is a lean air-fuel mixture.

11. A rotary piston engine in accordance with claim 8 wherein said second combustion supporting medium is a rich air-fuel mixture.

12. A rotary piston engine in accordance with claim 8 including recesses in said areas of said rotor peripheral wall and wherein the said one ends of the associated communication passages open into said recesses.

13. A rotary piston engine in accordance with claim 8 wherein said first intake port means is closed by said rotor subsequent to the interruption of the communication between said other ends of said communication passages and said second intake port means.

14. A rotary piston engine in accordance with claim 8 including an auxiliary combustion chamber defined at each of said other ends of said communication passages, said auxiliary combustion chambers opening directly onto said one side surface of said rotor for sequentially and cyclically communicating with said second intake port means to introduce second combustion supporting medium into said auxiliary combustion chambers for propagation of a combustion flame through said communication passages and into the working chambers.

15. A rotary piston engine in accordance with claim 8 wherein said second combustion supporting medium is a rich air-fuel mixture and wherein said one ends of said communication passages are offset from said first intake port means whereby said rich air-fuel mixture is introduced into the leading portion of said working chambers and said first combustion supporting medium is introduced into the trailing portion of said working chambers during said intake stroke for stratification of said first combustion supporting medium and said rich air-fuel mixture in said working chambers.

16. A rotary piston engine in accordance with claim 14 wherein said one ends of said communication passages open into the leading portion of the respective areas of said rotor peripheral wall in the direction of rotation of the rotor for propagation of a flame into the leading portion of said working chambers.

* * * * *